(12) United States Patent
Nakamura et al.

(10) Patent No.: US 10,520,675 B2
(45) Date of Patent: Dec. 31, 2019

(54) OPTICAL FIBER CUTTER

(71) Applicant: SEI Optifrontier Co., Ltd., Yokohama-shi, Kanagawa (JP)

(72) Inventors: Hiroshi Nakamura, Yokohama (JP); Takeshi Noake, Yokohama (JP); Naohisa Shirafuji, Yokohama (JP)

(73) Assignee: SEI Optifrontier Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/079,277

(22) PCT Filed: Nov. 17, 2016

(86) PCT No.: PCT/JP2016/084130
§ 371 (c)(1),
(2) Date: Aug. 23, 2018

(87) PCT Pub. No.: WO2017/149857
PCT Pub. Date: Sep. 8, 2017

(65) Prior Publication Data
US 2019/0049667 A1 Feb. 14, 2019

(30) Foreign Application Priority Data
Feb. 29, 2016 (JP) .................... 2016-037335

(51) Int. Cl.
*G02B 6/25* (2006.01)
*B26D 3/08* (2006.01)

(52) U.S. Cl.
CPC . *G02B 6/25* (2013.01); *B26D 3/08* (2013.01)

(58) Field of Classification Search
CPC .................... G02B 6/25; B26D 3/08
(Continued)

(56) References Cited

U.S. PATENT DOCUMENTS 5,761,976 A * 6/1998 Bailey ............... B26D 1/02
82/100
5,927,175 A * 7/1999 Franks ............... B23D 21/00
83/883

(Continued)

FOREIGN PATENT DOCUMENTS

CN 101231366 A 7/2008
CN 103443672 A 12/2013
(Continued)

*Primary Examiner* — Kenneth E Peterson
(74) *Attorney, Agent, or Firm* — Drinker Biddle & Reath LLP

(57) ABSTRACT

Provided is an optical fiber cutter for cutting an optical fiber, the optical fiber cutter including a cutter base, a slider, a blade member, a rotating body, and a rotation control mechanism that controls rotation of the blade member, in which the rotation control mechanism includes a main body rotatably provided in the cutter base, and a swinging portion that swings around a shaft provided in the cutter base in conjunction with rotation of the main body, and the swinging portion swings to a first position at which the swinging portion comes into contact with the rotating body to rotate the blade member by a predetermined angle when the slider reaches a predetermined position and a second position at which the swinging portion does not come into contact with the rotating body at the predetermined position of the slider.

5 Claims, 25 Drawing Sheets

(58) Field of Classification Search
USPC .......................................................... 83/955
See application file for complete search history.

(56) References Cited

U.S. PATENT DOCUMENTS

| | | | | |
|---|---|---|---|---|
| 8,291,803 B2* | 10/2012 | Honma | ................ | G02B 6/25 |
| | | | | 225/93 |
| 2004/0120678 A1* | 6/2004 | Hwang | ................ | G02B 6/245 |
| | | | | 385/134 |
| 2005/0226586 A1* | 10/2005 | Watte | ................ | G02B 6/25 |
| | | | | 385/134 |
| 2006/0201986 A1* | 9/2006 | Sasaki | ................ | B26D 3/08 |
| | | | | 225/105 |
| 2008/0178724 A1* | 7/2008 | Honma | ................ | G02B 6/25 |
| | | | | 83/887 |
| 2014/0000434 A1 | 1/2014 | Hasegawa et al. | | |
| 2018/0272552 A1* | 9/2018 | Sasaki | ................ | B26F 3/002 |

FOREIGN PATENT DOCUMENTS

| | | | | |
|---|---|---|---|---|
| JP | 2008-203815 A | | 9/2008 | |
| JP | 2012008472 A | * | 1/2012 | ............. G02B 6/25 |
| JP | 2012-194465 A | | 10/2012 | |
| JP | 2014-126583 A | | 7/2014 | |

* cited by examiner

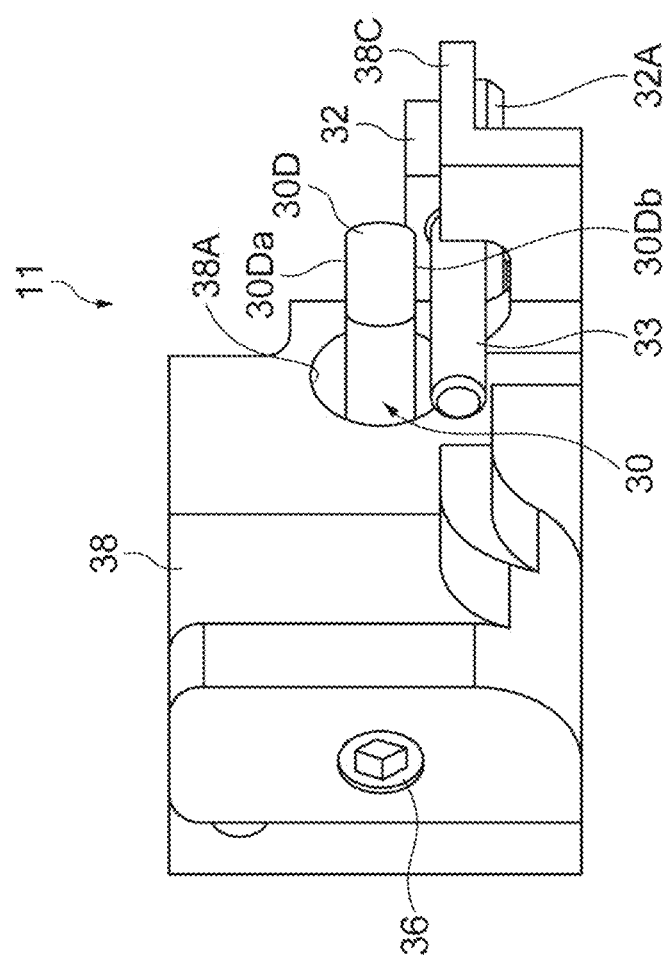

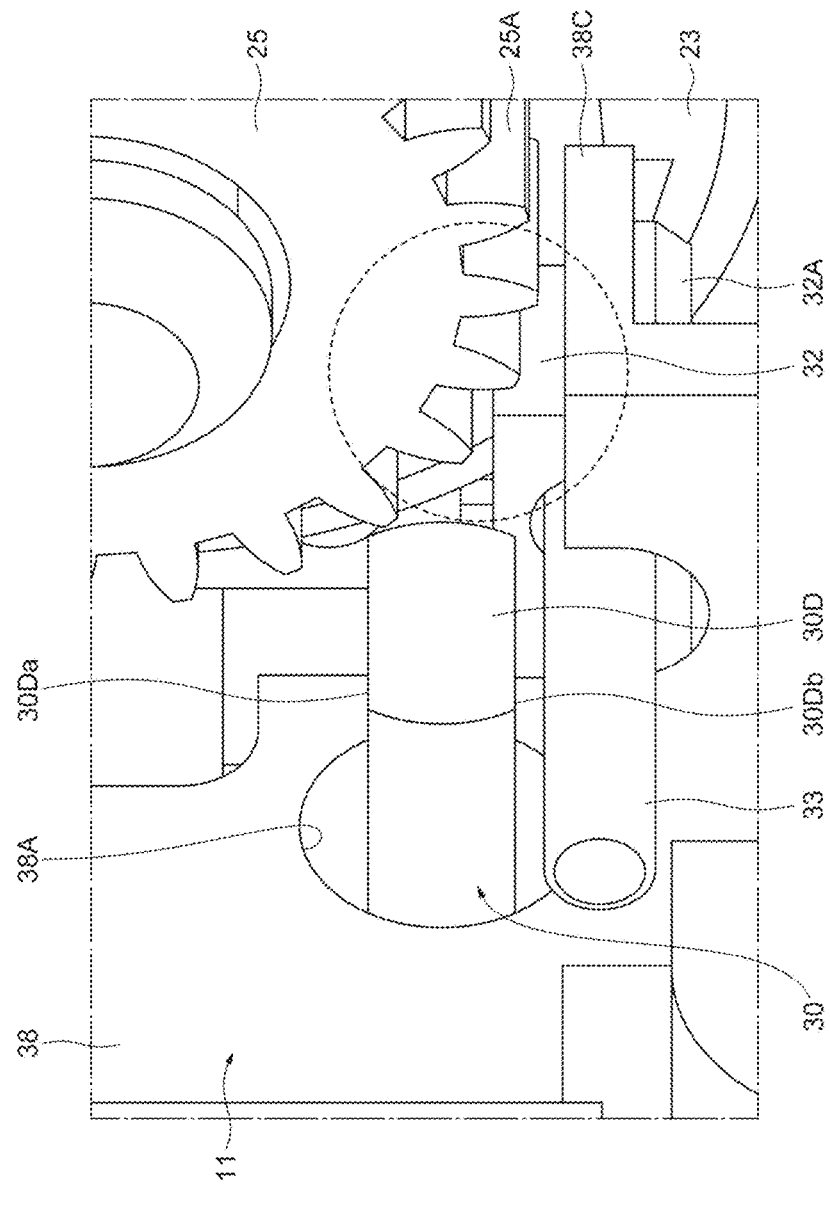

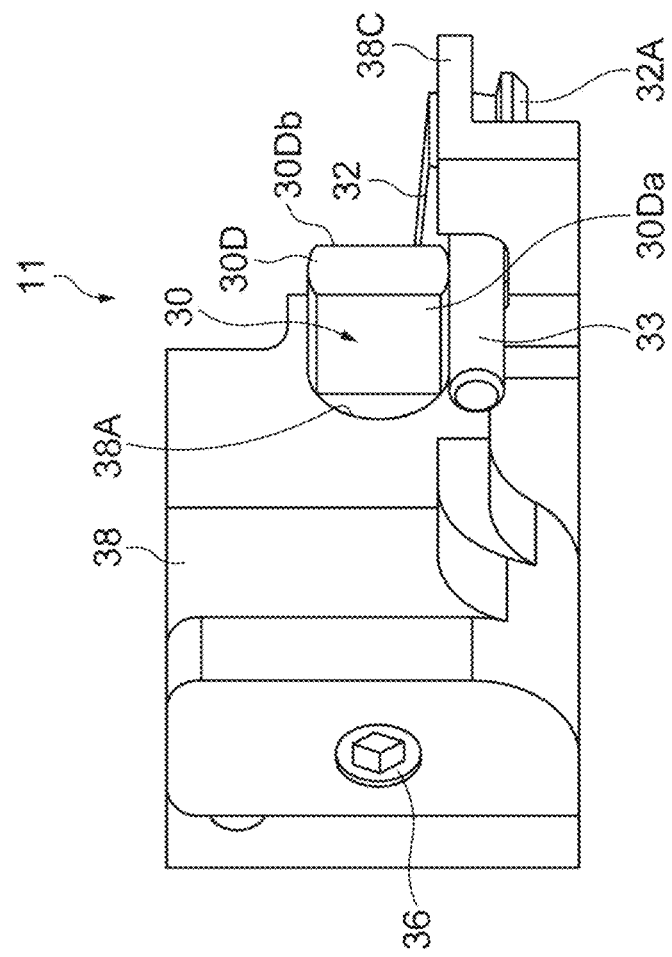

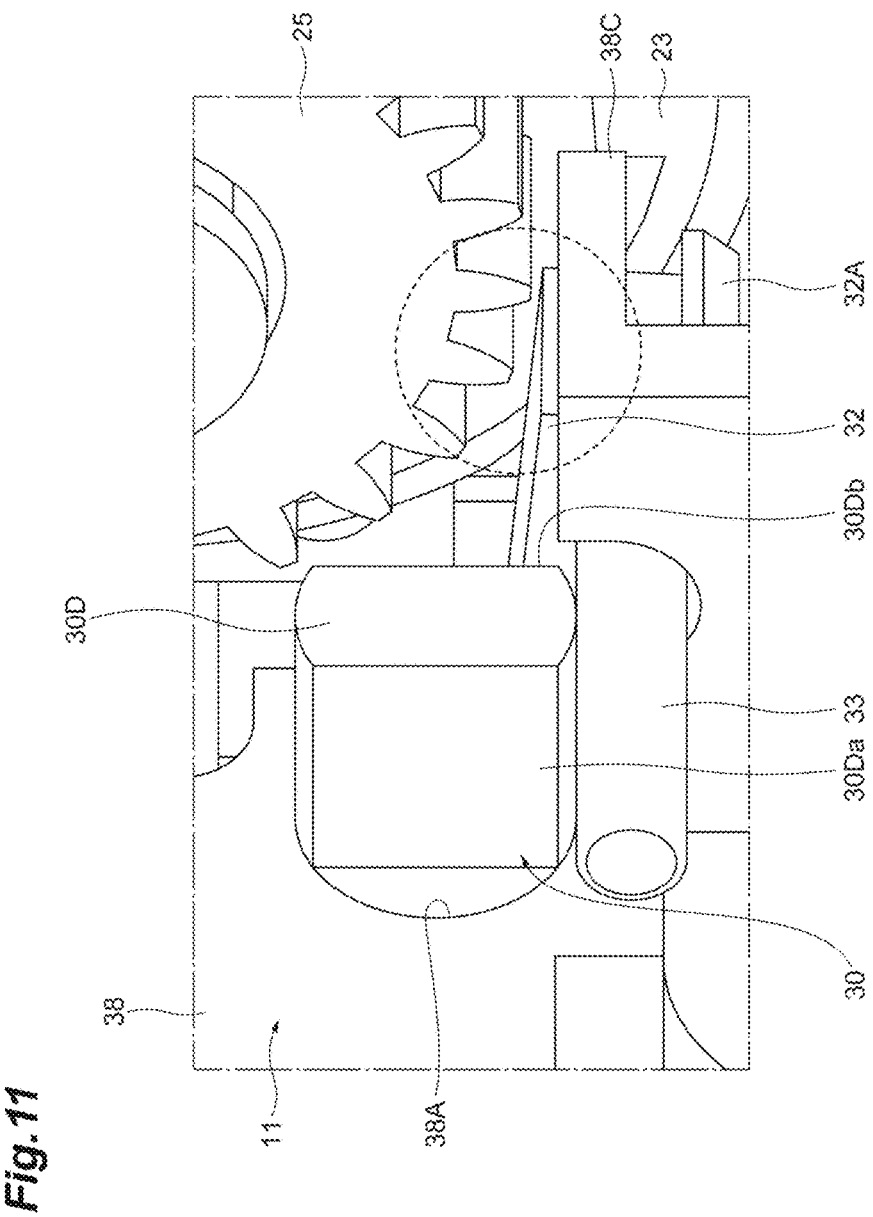

OPTICAL FIBER CUTTER

TECHNICAL FIELD

The present invention relates to an optical fiber cutter.

BACKGROUND ART

For example, an optical fiber cutter described in Patent Literature 1 has been known as a conventional optical fiber cutter. The optical fiber cutter described in Patent Literature 1 includes a cutter body, a slider movably provided on the cutter body, a blade member rotatably provided on the slider to scratch an optical fiber, blade rotation means for rotating the blade member, and rotation operation mode setting means for setting one of a plurality of rotation operation modes including a first mode for not rotating the blade member and a second mode for rotating the blade member by a predetermined angle using the blade rotation means each time the slider moves in one direction with respect to the cutter body.

CITATION LIST

Patent Literature

Patent Literature 1: Japanese Unexamined Patent Publication No. 2012-194465

SUMMARY OF INVENTION

Technical Problem

An optical fiber cutter is designed to have a size that allows an operator to hold and use the optical fiber cutter with one hand. For this reason, miniaturization of the optical fiber cutter has been attempted, and there is a limit to a space in which a mechanism for controlling rotation of a blade member such as rotation operation mode setting means is disposed. Therefore, in the optical fiber cutter, simplification of a configuration has been required.

An object of an aspect of the invention is to provide an optical fiber cutter capable of attempting simplification of a configuration.

Solution to Problem

As an aspect, the invention is an optical fiber cutter for cutting an optical fiber, the optical fiber cutter including a cutter base, a slider movably provided on the cutter base, a blade member rotatably provided on the slider to scratch the optical fiber, a rotating body provided on the blade member to rotate integrally with the blade member, and a rotation control mechanism that controls rotation of the blade member, in which the rotation control mechanism includes a main body rotatably provided in the cutter base, and a swinging portion that swings around a shaft provided in the cutter base in conjunction with rotation of the main body, and the swinging portion swings to a first position at which the swinging portion comes into contact with the rotating body to rotate the blade member by a predetermined angle when the slider reaches a predetermined position and a second position at which the swinging portion does not come into contact with the rotating body at the predetermined position of the slider.

Advantageous Effects of Invention

According to an aspect of the invention, it is possible to attempt simplification of a configuration.

BRIEF DESCRIPTION OF DRAWINGS

FIG. 6A is a perspective view illustrating the rotation control mechanism from one direction when an arm is at a first position.

FIG. 8 is an enlarged perspective view illustrating the rotation control mechanism and a rotating body illustrated in FIG. 7B.

FIG. 9A is a perspective view illustrating the rotation control mechanism from one direction when the arm is at a second position.

FIG. 11 is an enlarged perspective view illustrating the rotation control mechanism and the rotating body illustrated in FIG. 10B.

DESCRIPTION OF EMBODIMENTS

Description of Embodiments of the Invention

Figure 1:
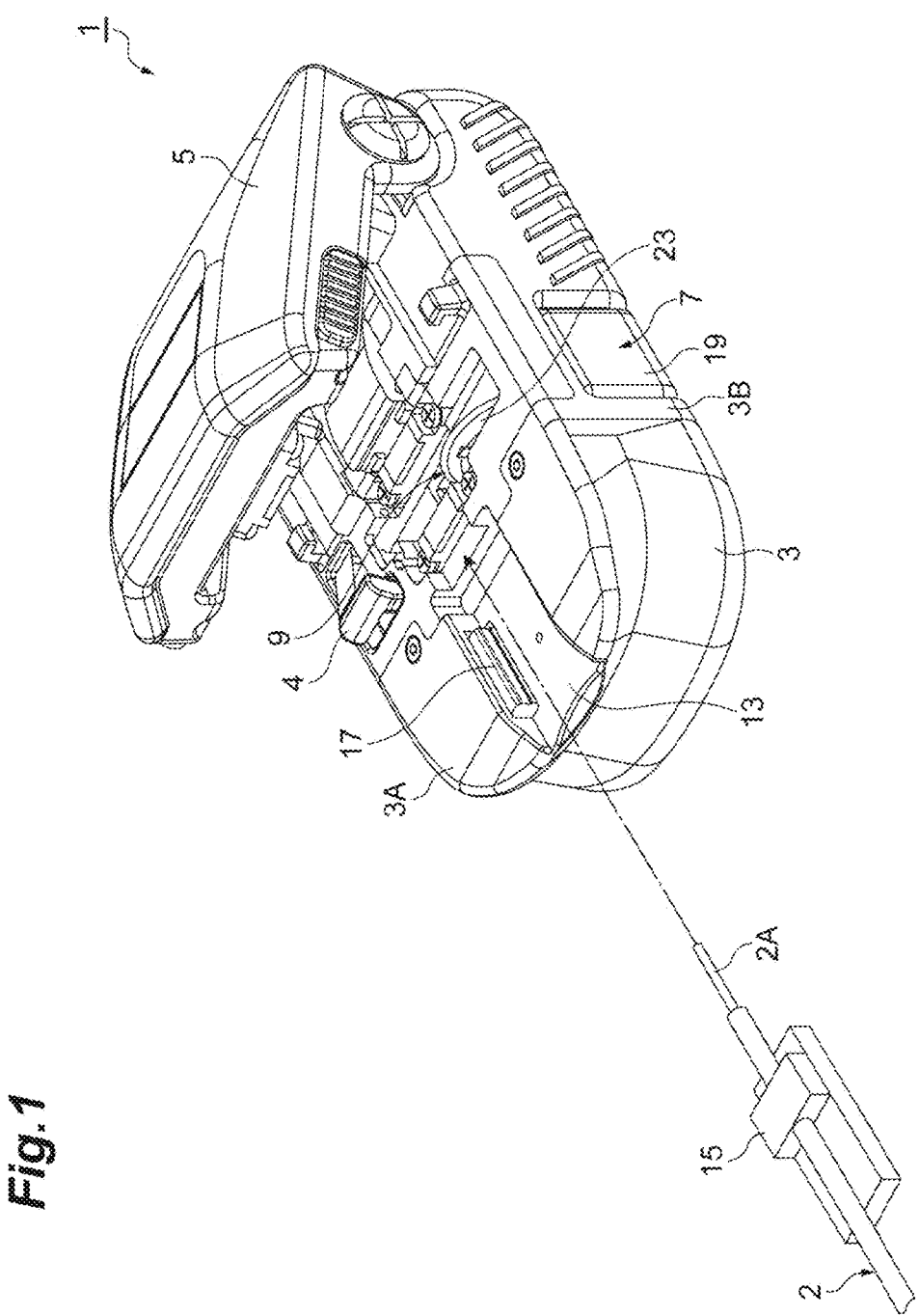
FIG. 1 is a perspective view illustrating an optical fiber cutter according to an embodiment.

First, embodiments of the invention will be listed and described.

As an aspect, the invention is an optical fiber cutter for cutting an optical fiber, the optical fiber cutter including a cutter base, a slider movably provided on the cutter base, a blade member rotatably provided on the slider to scratch the optical fiber, a rotating body provided on the blade member to rotate integrally with the blade member, and a rotation control mechanism that controls rotation of the blade member, in which the rotation control mechanism includes a main body rotatably provided in the cutter base, and a swinging portion that swings around a shaft provided in the cutter base in conjunction with rotation of the main body, and the swinging portion swings to a first position at which the swinging portion comes into contact with the rotating body to rotate the blade member by a predetermined angle when the slider reaches a predetermined position and a second position at which the swinging portion does not come into contact with the rotating body at the predetermined position of the slider.

In the optical fiber cutter according to the aspect of the invention, the rotation control mechanism includes the main body and the swinging portion. The swinging portion swings in conjunction with rotation of the main body. In the rotation control mechanism, the swinging portion is located at the first position and the second position by rotating the main body. The swinging portion comes into contact with the rotating body to rotate the blade member by the predetermined angle at the first position and does not come into contact with the rotating body at the second position. In this way, the rotation control mechanism may control rotation of the blade member by a simple configuration. Therefore, the configuration of the optical fiber cutter may be simplified.

In an embodiment, the rotating body may be a gear, and the swinging portion may rotate the blade member by the predetermined angle by coming into contact with teeth of the rotating body at the first position. In this configuration, the swinging portion and the rotating body reliably come into contact with each other, and thus the blade member may be more reliably rotated by the swinging portion.

In an embodiment, the rotation control mechanism may include a regulating portion that regulates a rotation range of the main body. In this configuration, rotation of the main body is regulated, and thus the swinging portion may be inhibited from unexpectedly swinging.

In an embodiment, the main body may be a member having a columnar shape and be provided to be rotatable around a shaft, and the swinging portion may be at the first position when the main body is rotated to a first rotation stop position and be at the second position when the main body is rotated to a second rotation stop position. In this configuration, the swinging portion may be swung to the first position or the second position by rotating the columnar main body to the first rotation stop position or the second rotation stop position. Therefore, the swinging portion may be easily switched to the first position or the second position.

In an embodiment, the main body may push down the swinging portion at the second rotation stop position. In this way, the swinging portion may be swung to the second position at which the swinging portion and the rotating body do not come into contact with each other.

Details of Embodiments of Invention

Hereinafter, preferred embodiments of the invention will be described in detail with reference to accompanying drawings. In description of the drawings, the same or a corresponding element will be denoted by the same reference numeral, and a repeated description will be omitted.

As illustrated in FIG. 1, the optical fiber cutter 1 is a device for cutting a glass fiber 2A exposed by removing a coating on a distal end of an optical fiber 2.

Figure 5:
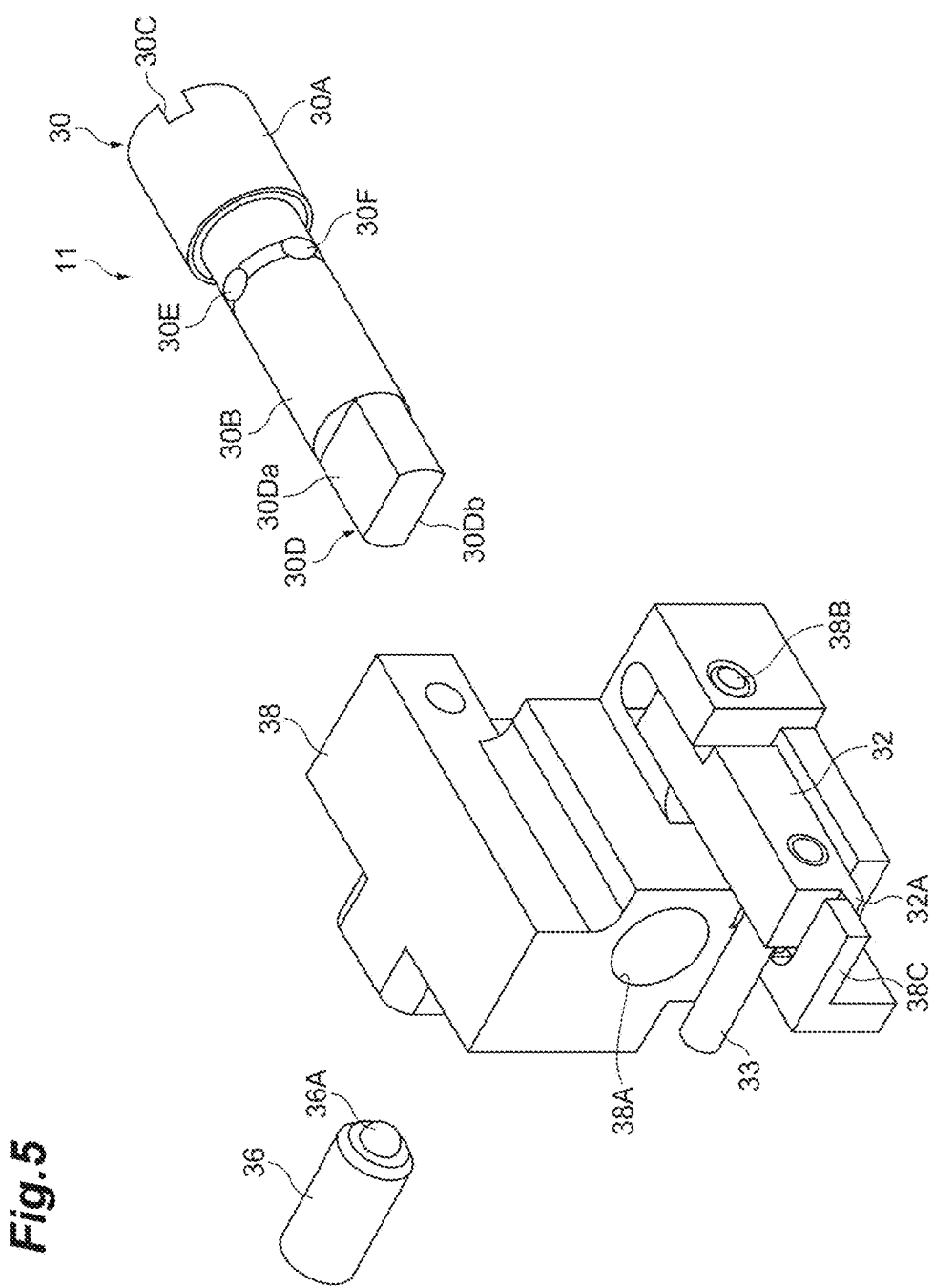
FIG. 5 is a perspective view illustrating the rotation control mechanism.

The optical fiber cutter 1 includes a cutter base 3, a cutter lid body 5, a slider 7, a blade 9, and a rotation control mechanism 11 (see FIG. 5).

The cutter base 3 has a holder guide (fiber guide) 13. The holder guide 13 is provided on an upper surface 3A of the cutter base 3. The holder guide 13 defines a position of the fiber holder 15 that holds the optical fiber 2 to be cut. The holder guide 13 has a substantially rectangular concave shape. A claw member 17 is disposed on one side surface side of the holder guide 13. In a normal state in which the fiber holder 15 is not set in the holder guide 13, the claw member 17 is in a state of protruding due to an urging force of a spring (not illustrated). When the fiber holder 15 is set in the holder guide 13, the claw member 17 is pushed and retracted against the urging force of the spring.

The cutter lid body 5 is attached to the cutter base 3 so as to be openable and closable. Specifically, the cutter lid body 5 is rotatably coupled to a rear end of the cutter base 3 via a shaft (not illustrated) extending in a width direction of the cutter base 3.

Figure 7A:
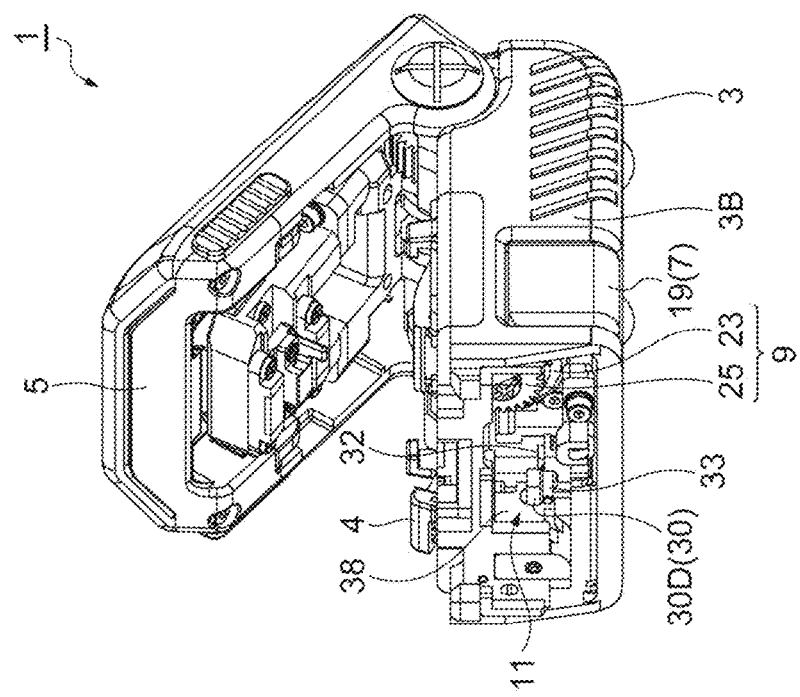
FIG. 7A is a diagram in whirl, a slider is at an initial position when the arm is at the first position.
Figure 7B:
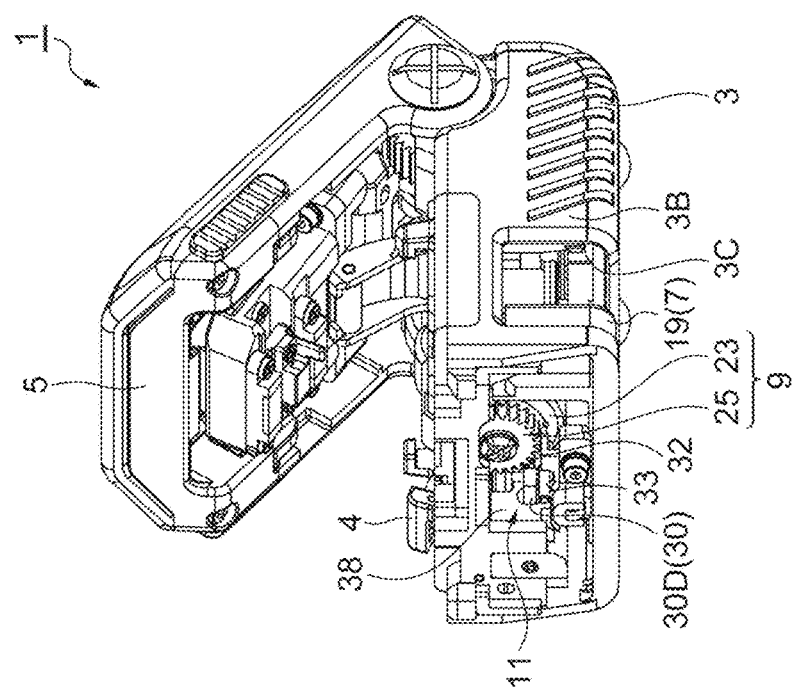
FIG. 7B is a diagram in which the slider is at a cutting start position when the arm is at the first position.

The slider 7 is provided on a back side of the holder guide 13 in the cutter base 3. As illustrated in FIG. 7A and FIG. 7B, the slider 7 is movable in the width direction of the cutter base 3. A pushing portion 19 is provided at one end of the slider 7. An opening 3C for exposing the pushing portion 19 is formed on one side surface 3B of the cutter base 3. A spring 21 (see FIG. 12A to FIG. 12D) for urging the slider 7 to the opening 3C side is provided between the other end of the slider 7 and the other side surface 3D of the cutter base 3. The slider 7 is normally at an initial position as illustrated in FIG. 1 due to the urging force of the spring 21.

Figure 4:
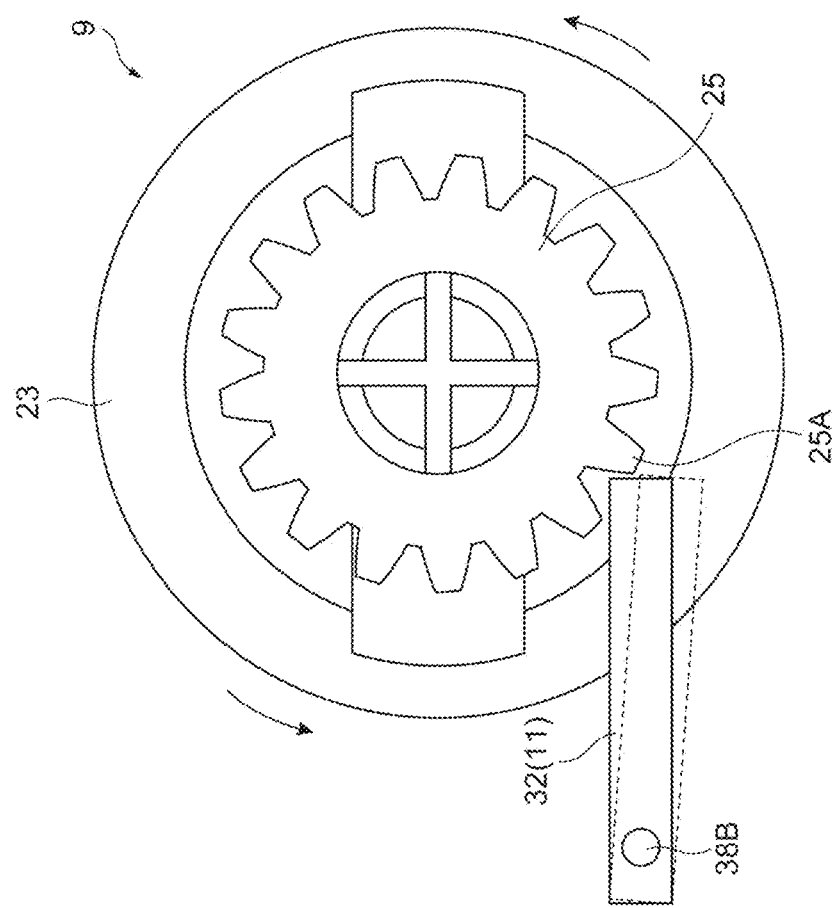
FIG. 4 is an exploded perspective view of a rotation control mechanism.

As illustrated in FIG. 4, the blade 9 has a blade member 23 and a rotating body 25. The blade member 23 is a disk-shaped blade that scratches the glass fiber 2A of the optical fiber 2. The blade member 23 is rotatably provided in the slider 7.

The rotating body 25 is attached to the blade member 23. The rotating body 25 rotates integrally with the blade member 23. In the present embodiment, the rotating body 25 is a circular gear. The rotating body 25 has a plurality of teeth 25A. As illustrated in FIG. 4, the rotating body 25 is rotated in one direction (in the present embodiment, counterclockwise viewed from a front side of the cutter base 3) by coming into contact with an arm 32 described below.

The rotation control mechanism 11 controls rotation of the blade member 23 (the blade 9). As illustrated in FIG. 5, the rotation control mechanism 11 includes a shaft (main body) 30, an arm (swinging portion) 32, a spring 34, and a rotation regulating portion 36. The rotation control mechanism 11 is provided in a fixed portion 38. The shaft 30, the arm 32, the spring 21, and the rotation regulating portion 36 are unitized by being attached to the fixed portion 38. The fixed portion 38 is a member included in a part of the cutter base 3, and is attached to the cutter base 3.

Figure 2:
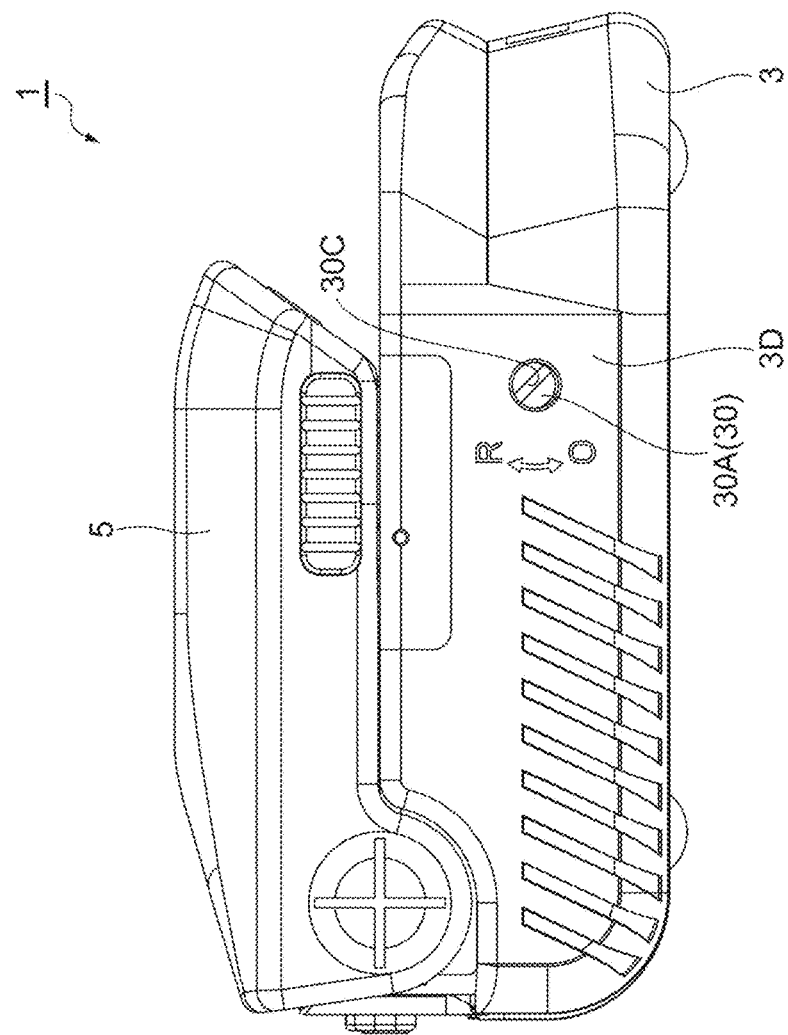
FIG. 2 is a side view of the optical fiber cutter illustrated in FIG. 1.

The shaft 30 is rotatably provided in the fixed portion 38. The shaft 30 is a columnar member. The shaft 30 is inserted into an insertion hole 38A provided in the fixed portion 38. The shaft 30 is rotatably provided in the fixed portion 38 around an axis along a longitudinal direction of the shaft 30. The shaft 30 has a head 30A and a shaft 30B. A diameter of the head 30A is larger than a diameter of the shaft 30B. As illustrated in FIG. 2, the head 30A is exposed on the other side surface 3D of the cutter base 3. A groove 30C is provided on the head 30A. A surface of the head 30A is located inside the other side surface 3D of the cutter base 3.

A distal end 30D (an end on the opposite side from the head 30A) of the shaft 30B has two chamfers. Specifically, two plane surfaces 30Da and 30Db facing each other are provided on the distal end 30D. The two plane surfaces 30Da and 30Db are substantially parallel to each other. The two plane surfaces 30Da and 30Db are formed by a D-cut process. The two plane surfaces 30Da and 30Db are provided on an axis side (inner side) of the shaft 30B with respect to a peripheral surface of the shaft 30B. Circular hollow portions 30E and 30F are provided on the shaft 30B. The hollow portions 30E and 30F are formed at two places with a predetermined interval in a circumferential direction of the shaft 30B. Each of the hollow portions 30E and 30F is engaged with an engaging portion 36A of the rotation regulating portion 36 described below. Each of the hollow portions 30E and 30F is engaged with the engaging portion 36A of the rotation regulating portion 36 at a first rotation stop position and a second rotation stop position at which rotation of the shaft 30 is stopped.

As illustrated in FIG. 8 and FIG. 11, in the shaft 30, the shaft 30B is located in the insertion hole 38A of the fixed portion 38, and the distal end 30D of the shaft 30B protrudes from the fixed portion 38. The shaft 30 rotates between the first rotation stop position and the second rotation stop position. As illustrated in FIG. 6A, FIG. 6B, FIG. 7A, and FIG. 7B, the first rotation stop position corresponds to a position at which the plane surfaces 30Da and 30Db provided at the distal end 30D of the shaft 30B are substantially parallel to a front-back direction of the cutter base 3. As illustrated in FIG. 9A, FIG. 9B, FIG. 10A, and FIG. 10B, the second rotation stop position corresponds to a position at which the plane surfaces 30Da and 30Db provided at the distal end 30D of the shaft 30B are substantially parallel to a vertical direction of the cutter base. For example, the shaft 30 may be rotated by inserting a minus screwdriver, etc. into the groove 30C of the head 30A.

The arm 32 swings in conjunction with rotation of the shaft 30. The arm 32 is swingably provided on the fixed portion 38 (the cutter base 3). The arm 32 is a prismatic member. The arm 32 is pivotally supported by the shaft 38B fixed to the fixed portion 38. One end of the arm 32 in the longitudinal direction is pivotally supported by the shaft 38B, and the arm 32 swings around the shaft 38B. A swinging angle of the arm 32 is regulated by a regulating piece 38C of the fixed portion 38. Specifically, swinging of the arm 32 in a clockwise direction as viewed from a back side of the cutter base 3 is regulated by a protrusion 32A provided at the other end (distal end) in the longitudinal direction coming into contact with the regulating piece 38C.

A contact portion 33 is provided in the arm 32. The contact portion 33 is a columnar member. The contact portion 33 is attached to the other end of the arm 32. Specifically, the contact portion 33 is attached to the arm 32 such that the longitudinal direction thereof is substantially orthogonal to the longitudinal direction of the arm 19. The contact portion 33 is located below the distal end 30D of the shaft 30.

As illustrated in FIG. 4, the arm 32 rotates the blade member 23 by a predetermined angle in one direction (counterclockwise direction when viewed from the front side of the cutter base 3 in the present embodiment) by coming into contact with the rotating body 25. Specifically, the arm 32 rotates the blade member 23 by coming into contact with the teeth 25A of the rotating body 25.

The arm 32 swings between a first position and a second position. The first position is a position indicated by a solid line in FIG. 4. The second position is a position indicated by a broken line in FIG. 4. The arm 32 swings to the second position when the contact portion 33 comes into contact with the shaft 30 and the contact portion 33 is pushed down. The arm 32 comes into contact with the teeth 25A of the rotating body 25 at the first position. The arm 32 does not come into contact with the rotating body 25 at the second position.

The spring 34 is an urging member for urging the arm 32. For example, the spring 34 is a coil spring. The spring 34 is disposed between a lower portion of the arm 32 and the fixed portion 38. The spring 34 urges the arm 32 so that the arm 32 swings clockwise around the shaft 38B as viewed from the back side of the cutter base 3. The spring 34 contracts when the contact portion 33 of the arm 32 is pushed down by the shaft 30.

The rotation regulating portion 36 regulates a rotation range of the shaft 30. The rotation regulating portion 36 is a columnar member. The rotation regulating portion 36 is screwed into a screw hole (not illustrated) provided in the fixed portion 38. The screw hole communicates with the insertion hole 38A and is provided at a position corresponding to the hollow portions 30E and 30F of the shaft 30 inserted into the insertion hole 38A.

The engaging portion 36A having a spherical shape is provided at a distal end of the rotation regulating portion 36. The engaging portion 36A is urged toward the distal end side of the rotation regulating portion 36 by a spring (not illustrated). That is, the engaging portion 36A retracts to the inside of the rotation regulating portion 36 by being pressed. The engaging portion 36A is engaged with each of the hollow portions 30E and 30F provided on the shaft 30B of the shaft 30. When the engaging portion 36A is engaged with each of the hollow portions 30E and 30F, the rotation regulating portion 36 regulates the rotation range of the shaft 30. When the shaft 30 is rotated, the engaging portion 36A is pressed by the shaft 30B of the shaft 30 to retract inward and permits rotation of the shaft 30. When the engaging portion 36A and the hollow portion 30E are engaged with each other, the shaft 30 corresponds to the first rotation stop position. When the engaging portion 36A and the hollow portion 30F are engaged with each other, the shaft 30 corresponds to the second rotation stop position.

Figure 6B:
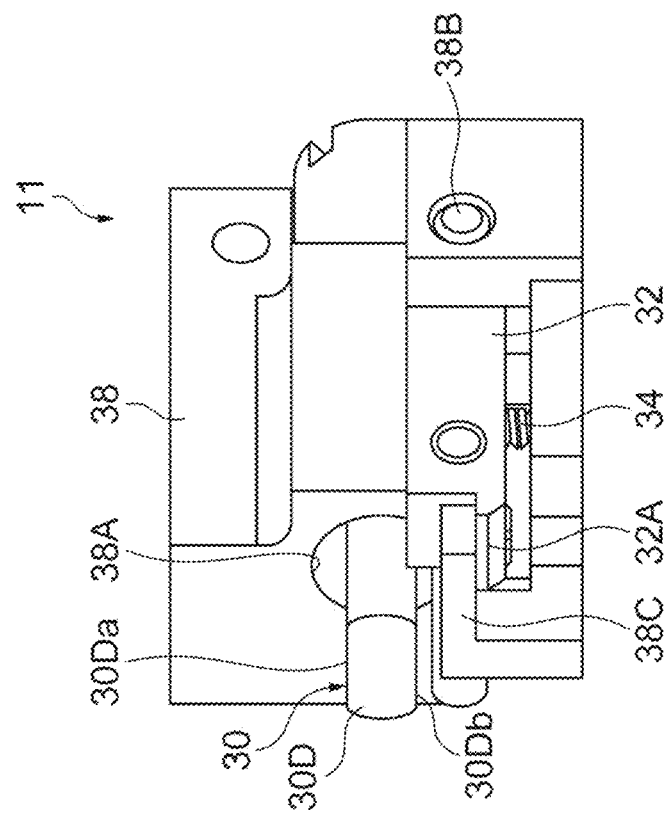
FIG. 6B is a perspective view illustrating the rotation control mechanism from the other direction when the arm is at the first position.

Next, a description will be given of an operation of the rotation control mechanism 11. As illustrated in FIG. 6A and FIG. 6B, in the rotation control mechanism 11, when the shaft 30 corresponds to the first rotation stop position, the arm 32 is located at the first position. In this instance, when the slider 7 is moved from an initial position illustrated in FIG. 7A to a cutting start position (predetermined position) illustrated in FIG. 7B, the arm 32 comes into contact with the teeth 25A of the rotating body 25 as illustrated in FIG. 8. In this way, the blade member 23 rotates by a predetermined angle in one direction.

Figure 9B:
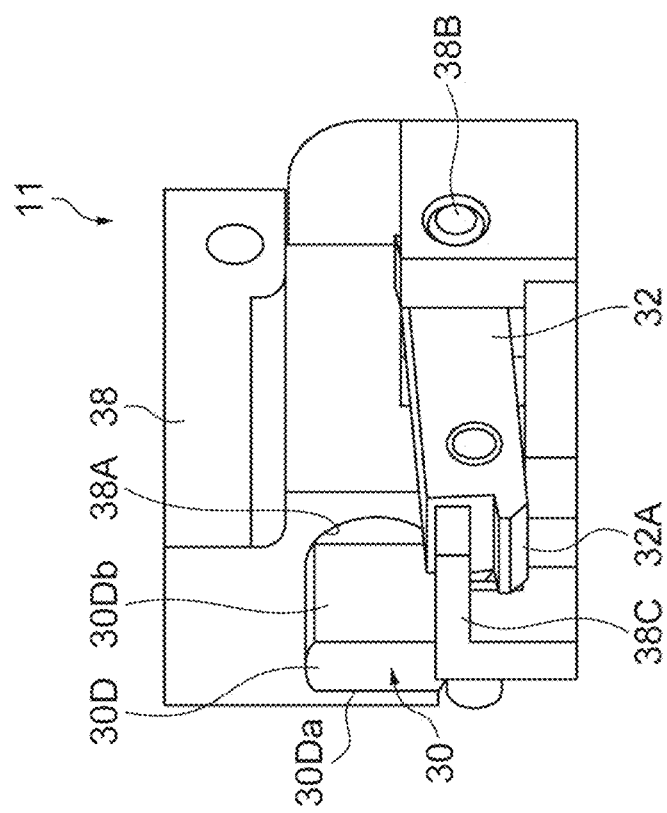
FIG. 9B is a perspective view illustrating the rotation control mechanism from the other direction when the arm is at the second position.
Figure 10A:
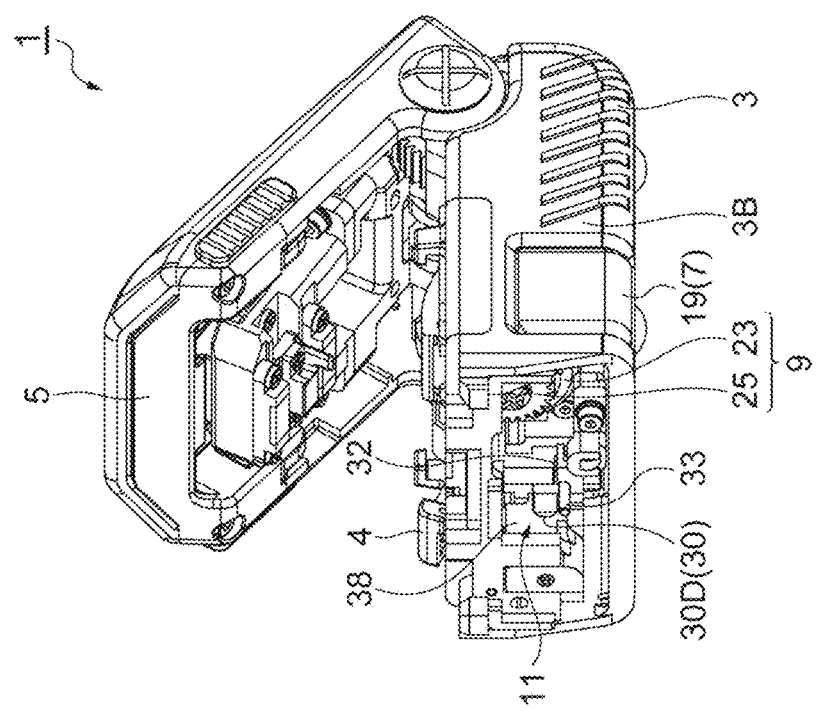
FIG. 10A is a diagram in which the slider is at the initial position when the arm is at the second position.
Figure 10B:
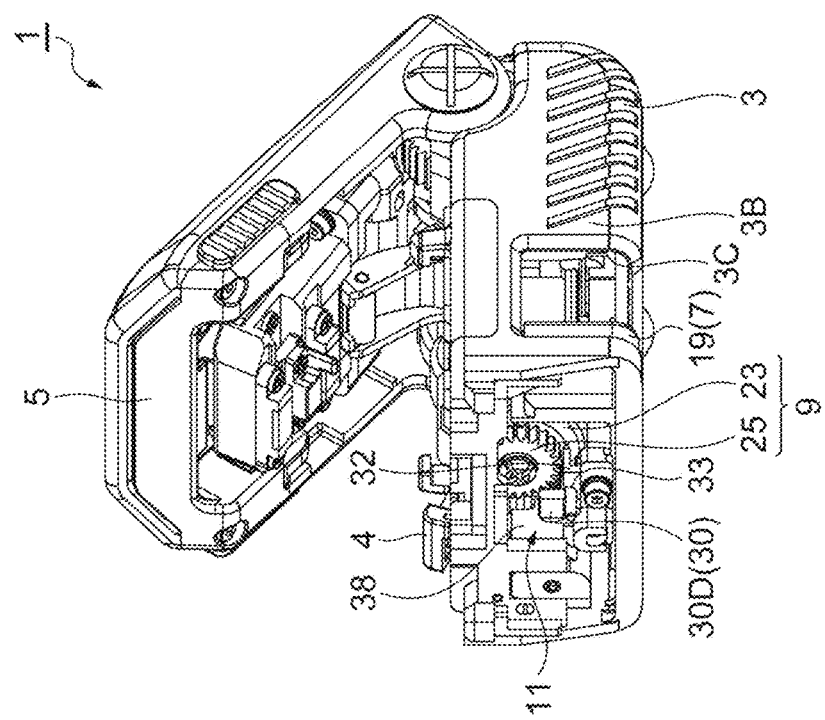
FIG. 10B is a diagram in which the slider is at the cutting start position when the arm is at the second position.

As illustrated in FIG. 9A and FIG. 9B, in the rotation control mechanism 11, when the shaft 30 corresponds to the second rotation stop position, the arm 32 is located at the second position. In this instance, when the slider 7 is moved from an initial position illustrated in FIG. 10A to a cutting start position illustrated in FIG. 10B, the arm 32 does not come into contact with rotating body 25 as illustrated in FIG. 11. For this reason, the blade member 23 does not rotate.

Figure 12A:
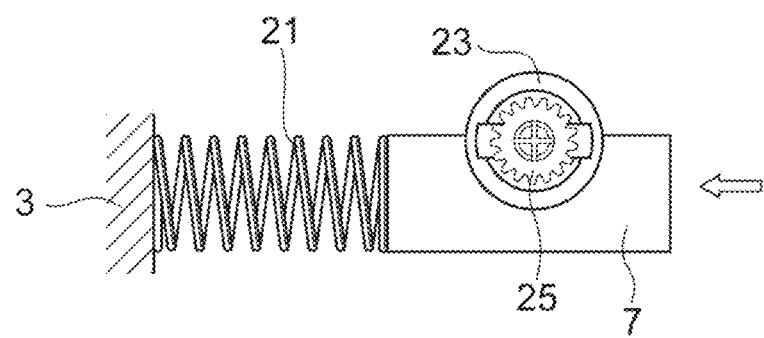
FIG. 12A is a conceptual diagram illustrating a state in which an optical fiber is scratched by the optical fiber cutter illustrated in FIG. 1.
Figure 12B:
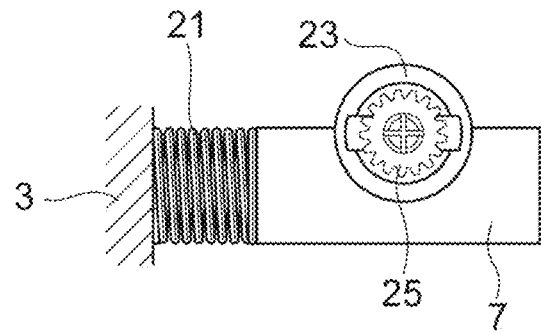
FIG. 12B is a conceptual diagram illustrating a state in which the optical fiber is scratched by the optical fiber cutter illustrated in FIG. 1.

Next, a description will be given of a method of cutting the optical fiber 2 using the optical fiber cutter 1. As illustrated in FIG. 12A, when an operation of cutting the optical fiber 2 is performed using the optical fiber cutter 1, first, the pushing portion 19 of the slider 7 is pushed in while the cutter lid body 5 is open with respect to the cutter base 3. Then, as illustrated in FIG. 12B, the slider 7 moves to the opposite side (the other side surface 3D side) of the opening 3C against the urging force of the spring 21 and reaches the cutting start position. In this instance, the slider 7 is held at the cutting start position by a locking structure (not illustrated) provided on the cutter base 3.

In addition, when the shaft 30 is at the first rotation stop position in the rotation control mechanism 11, that is, the arm 32 is at the first position, the rotating body 25 rotates by a predetermined amount by the arm 32 coming into contact with the rotating body 25. Accordingly, the blade member 23 rotates by a predetermined amount. For this reason, each time the slider 7 reaches the cutting start position, a part of the blade member 23 coming into contact with the optical fiber 2 is shifted by a predetermined amount. In addition, when the shaft 30 is at the second rotation stop position in the rotation control mechanism 11, that is, the arm 32 is at the second position, the arm 32 does not come into contact with the rotating body 25, and thus the blade member 23 does not rotate.

Figure 12C:
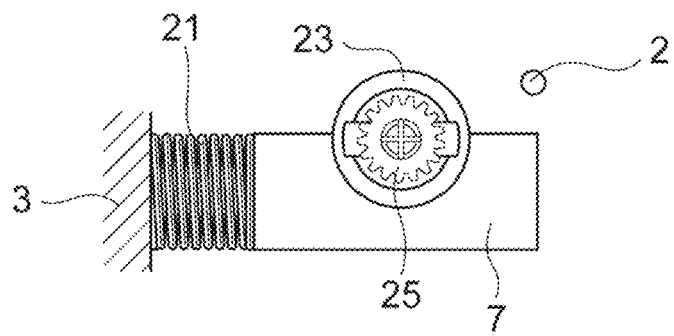
FIG. 12C is a conceptual diagram illustrating a state in which the optical fiber is scratched by the optical fiber cutter illustrated in FIG. 1.

In this state, as illustrated in FIG. 1, the fiber holder 15 holding the optical fiber 2 is set in the holder guide 13 of the cutter base 3. In this way, as illustrated in FIG. 12C, the optical fiber 2 is positioned with respect to the slider 7.

Figure 3:
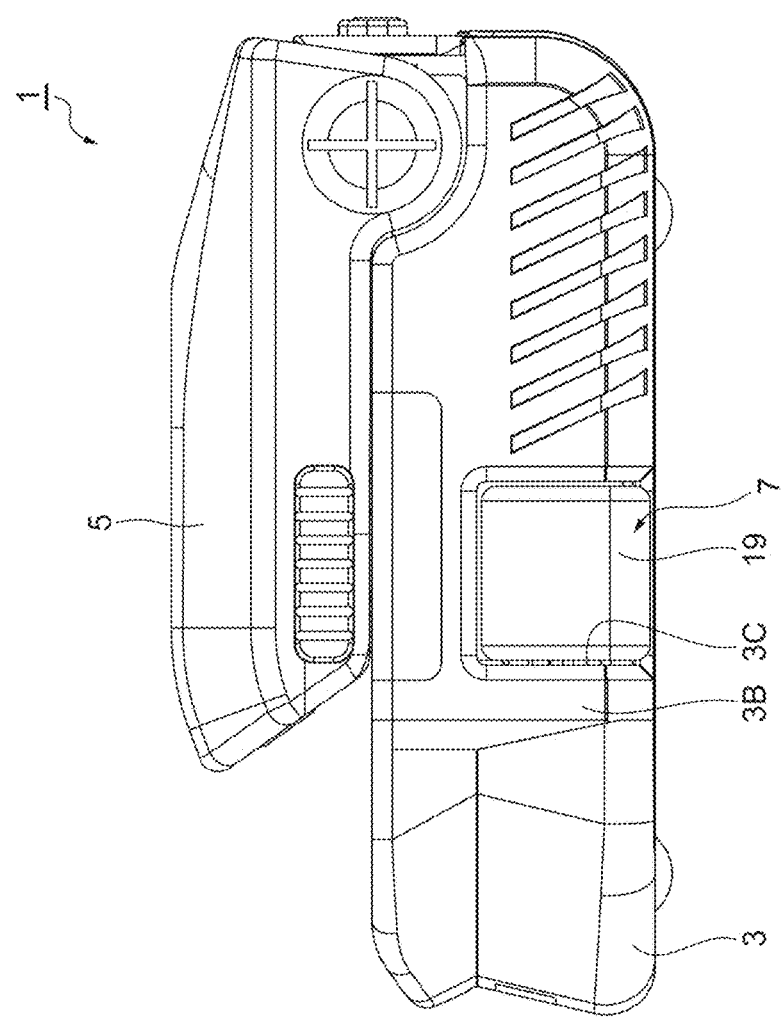
FIG. 3 is a side view of the optical fiber cutter illustrated in FIG. 1.
Figure 12D:
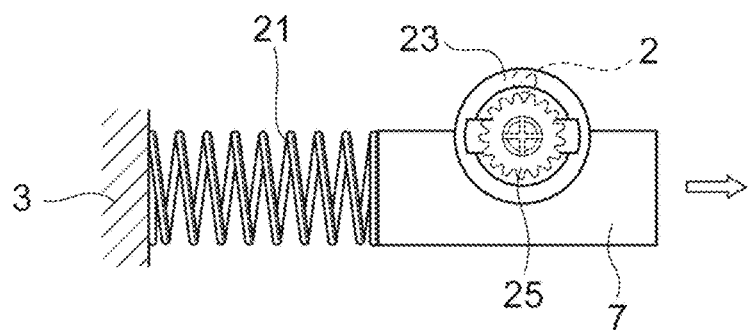
FIG. 12D is a conceptual diagram illustrating a state in which the optical fiber is scratched by the optical fiber cutter illustrated in FIG. 1.

Subsequently, as illustrated in FIG. 2 and FIG. 3, the cutter lid body 5 is closed with respect to the cutter base 3. Then, a locked state of the slider 7 with respect to the cutter base 3 is released by a lock release portion 4 provided on the cutter base 3. In this way, as illustrated in FIG. 12D, the slider 7 moves to the opening 3C side due to the urging force of the spring 21 and returns to the initial position (cut completion position).

In this instance, when the blade member 23 moves to the opening 3C side, the blade member 23 comes into contact with the glass fiber 2A of the optical fiber 2, the glass fiber 2A is scratched by the blade member 23, and the glass fiber 2A is cut.

As described above, in the optical fiber cutter 1 according to the present embodiment, the rotation control mechanism 11 includes the shaft 30 and the arm 32. The arm 32 swings in conjunction with rotation of the shaft 30. In the rotation control mechanism 11, the arm 32 is positioned at the first position and the second position by rotating the shaft 30. The arm 32 comes into contact with the rotating body 25 to rotate the blade member 23 by a predetermined angle at the first position, and does not come into contact with the rotating body 25 at the second position. In this way, the rotation control mechanism 11 may control rotation of the blade member 23 by a simple configuration. Therefore, the configuration of the optical fiber cutter 1 may be simplified.

In the optical fiber cutter 1 according to the present embodiment, the rotating body 25 is a gear. The arm 32 rotates the blade member 23 by a predetermined angle by coming into contact with the teeth 25A of the rotating body 25 at the first position. In this configuration, the arm 32 and the rotating body 25 reliably come into contact with each other, and thus the blade member 23 may be more reliably rotated by the arm 32.

In the optical fiber cutter 1 according to the present embodiment, the rotation control mechanism 11 includes the rotation regulating portion 36 that regulates the rotation range of the shaft 30. In addition, the surface of the head 30A is located inside the other side surface 3D of the cutter base 3. In this configuration, rotation of the shaft 30 is regulated, and thus the arm 32 may be inhibited from unexpectedly swinging.

In the optical fiber cutter 1 according to the present embodiment, the shaft 30 is a member having a columnar shape and is provided to be rotatable about a shaft center. The arm 32 is at the first position when the shaft 30 is rotated to the first rotation stop position, and is at the second position when the shaft 30 is rotated to the second rotation stop position. In this configuration, the arm 32 may be swung to the first position or the second position by rotating the columnar shaft 30 to the first rotation stop position or the second rotation stop position. Therefore, it is possible to easily switch the arm 32 to the first position or the second position.

In the optical fiber cutter 1 according to the present embodiment, the shaft 30 pushes down the arm 32 at the second rotation stop position. In this way, the arm 32 may be swung to the second position at which the arm 32 and the rotating body 25 do not come into contact with each other.

The invention is not limited to the above-described embodiment and may be variously modified within a range not departing from a subject matter of the invention.

Figure 13A:
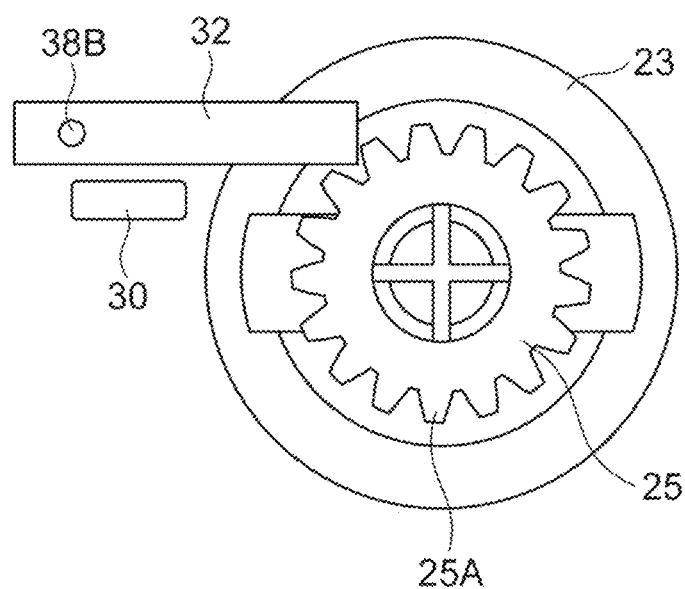
FIG. 13A is a diagram illustrating a rotation control mechanism of an optical fiber cutter according to another embodiment.
Figure 13B:
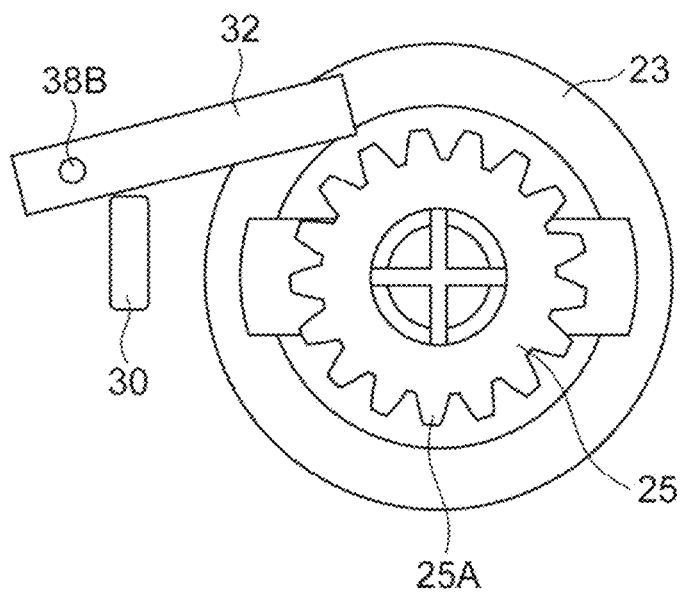
FIG. 13B is a diagram illustrating a rotation control mechanism of an optical fiber cutter according to another embodiment.

In the above embodiment, a mode in which the arm 32 is swing to the first position and the second position by the distal end 30D pushing down the contact portion 33 provided at the distal end of the acid 32 due to rotation of the shaft 30 has been described as an example. However, the mode of swinging the arm 32 is not limited thereto. For example, it is possible to adopt a mode in which the arm 32 is urged by an urging member to swing in the clockwise direction, thereby being at the first position in a state of not coming into contact with the shaft 30 as illustrated in FIG. 13A, and is pushed up by the shaft 30 to be at the second position as illustrated in FIG. 13B.

Figure 14A:
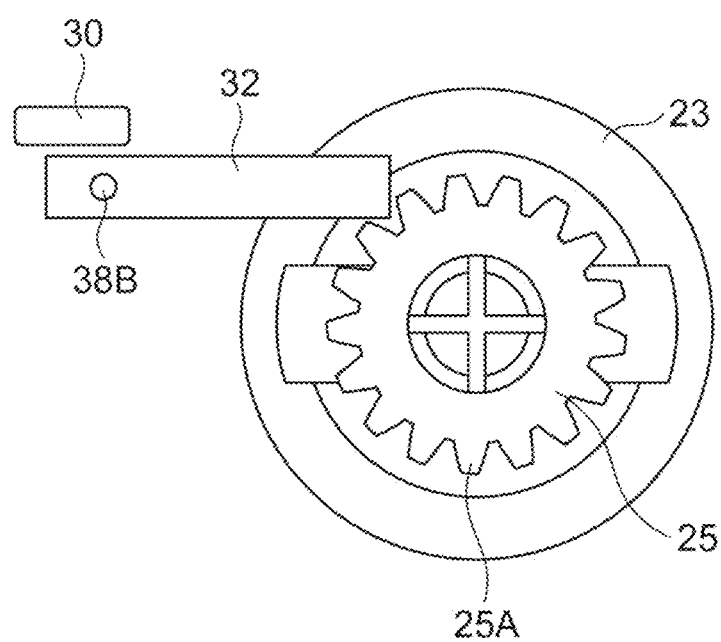
FIG. 14A is a diagram illustrating a rotation control mechanism of an optical fiber cutter according to another embodiment.
Figure 14B:
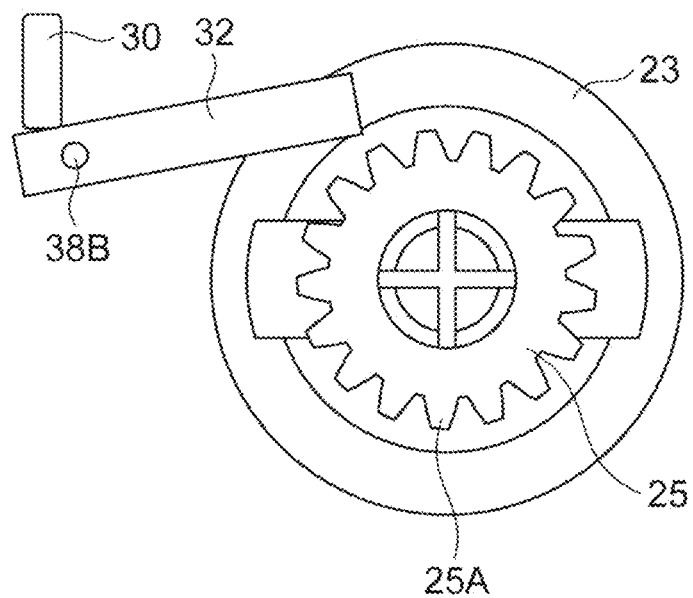
FIG. 14B is a diagram illustrating a rotation control mechanism of an optical fiber cutter according to another embodiment.

Alternatively, it is possible to adopt a mode in which the arm 32 is urged by an urging member to swing in the clockwise direction, thereby being at the first position in a state of not coming into contact with the shaft 30 as illustrated in FIG. 14A, and is at the second position by an end of the arm 32 on the shaft 38B side being pushed down by the shaft 30 as illustrated in FIG. 14B.

Figure 15A:
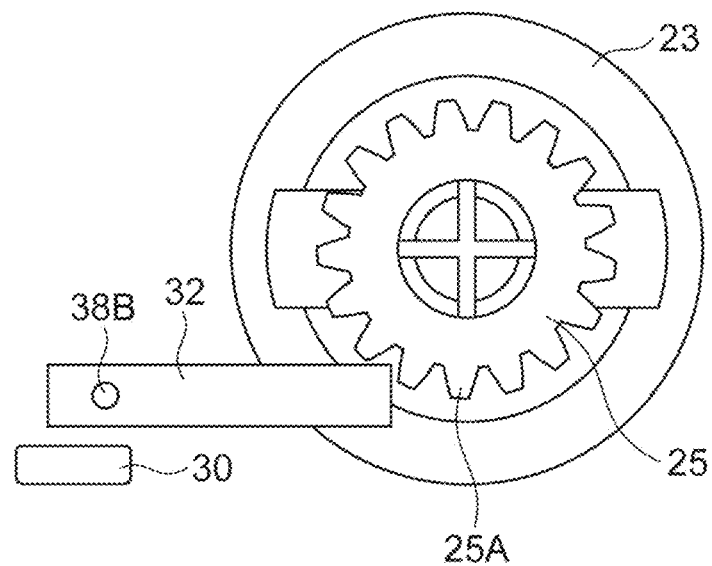
FIG. 15A is a diagram illustrating a rotation control mechanism of an optical fiber cutter according to another embodiment.
Figure 15B:
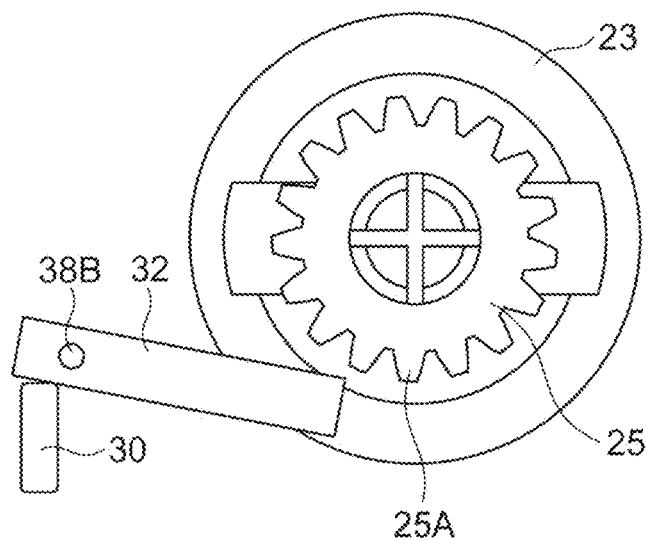
FIG. 15B is a diagram illustrating a rotation control mechanism of an optical fiber cutter according to another embodiment.

Alternatively, it is possible to adopt a mode in which the arm 32 is urged by an urging member to swing in the counterclockwise direction, thereby being at the first position in a state of not coming into contact with the shaft 30 as illustrated in FIG. 15A, and is at the second position by the end of the arm 32 on the shaft 38B side being pushed up by the shaft 30 as illustrated in FIG. 15B. In short, it suffices that the arm 32 swings to the first position and the second position according to rotation of the shaft 30.

In the above embodiment, a mode in which the rotating body 25 provided in the blade member 23 is a gear has been described as an example. However, the rotating body 25 is not limited thereto. For example, the rotating body may correspond to a disk-shaped member. In this case, it is preferable that frictional resistance of a portion coming into contact with the arm 32 is high. In this way, when the arm 32 comes into contact with the rotating body, the rotating body may be reliably rotated.

In the above embodiment, a mode in which the distal end 30D of the shaft 30B in the shaft 30 has the plane surfaces 30Da and 30Db, and the contact portion 33 of the arm 32 is pushed down by the distal end 30D has been described as an example. However, a mode of the shaft (main body) is not limited thereto. It suffices that the main body is rotatably provided in the cutter base 3, and the swinging portion is swing by rotation.

In the above embodiment, a mode in which the rotating body 25 is attached to the blade member 23 has been described as an example. However, the blade member 23 and the rotating body 25 may be integrally molded.

REFERENCE SIGNS LIST

1: optical fiber cutter, 2: optical fiber, 3: cutter base, 7: slider, 11: rotation control mechanism, 9: blade, 23: blade member, 25: rotating body, 25A: teeth, 30: shaft (main body), 32: arm (swinging body), 38B: shaft.

The invention claimed is:

1. An optical fiber cutter for cutting an optical fiber, the optical fiber cutter comprising:
   a cutter base;
   a slider movably provided on the cutter base;
   a blade member rotatably provided on the slider to scratch the optical fiber;
   a rotating body provided on the blade member to rotate integrally with the blade member; and
   a rotation control mechanism that controls rotation of the blade member,
   wherein the rotation control mechanism includes
   a main body rotatably provided in the cutter base, and
   a swinging portion that swings around a shaft provided in the cutter base in response to rotation of the main body, and
   the swinging portion swings to a first position at which the swinging portion comes into contact with the rotating body to rotate the blade member by a predetermined angle when the slider reaches a predetermined position and a second position at which the swinging portion does not come into contact with the rotating body at the predetermined position of the slider.

2. The optical fiber cutter according to claim 1,
   wherein the rotating body is a gear, and
   the swinging portion rotates the blade member by the predetermined angle by coming into contact with teeth of the rotating body at the first position.

3. The optical fiber cutter according to claim 1, wherein the rotation control mechanism includes a regulating portion that regulates a rotation range of the main body.

4. The optical fiber cutter according to claim 1,
   wherein the main body is a member having a columnar shape and is provided to be rotatable around a shaft, and
   the swinging portion is at the first position when the main body is rotated to a first rotation stop position and is at the second position when the main body is rotated to a second rotation stop position.

5. The optical fiber cutter according to claim 4, wherein the main body pushes down the swinging portion at the second rotation stop position.

* * * * *